(12) United States Patent
Kanazawa et al.

(10) Patent No.: US 6,255,930 B1
(45) Date of Patent: Jul. 3, 2001

(54) IGNITION DEVICE FOR INTERNAL COMBUSTION ENGINE

(75) Inventors: Akira Kanazawa, Tokyo; Noriyuki Murata; Toshiharu Saito, both of Yokohama; Harumi Aoki, Sagamihara; Akira Nakatsuka, Yokohama, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/410,758

(22) Filed: Oct. 1, 1999

Related U.S. Application Data

(62) Division of application No. 08/967,945, filed on Nov. 12, 1997, now abandoned.

(30) Foreign Application Priority Data

Nov. 18, 1996 (JP) .................................................. 8-306115
Jan. 16, 1997 (JP) .................................................. 9-005221

(51) Int. Cl.⁷ .............................. H01F 27/02; H01F 27/30
(52) U.S. Cl. .............................. 336/96; 336/198; 336/208
(58) Field of Search .................................... 336/198, 208, 336/96, 205

(56) References Cited

U.S. PATENT DOCUMENTS

| | | |
|---|---|---|
| 3,043,994 | 7/1962 | Anderson et al. . |
| 4,019,167 * | 4/1977 | Baker ..................................... 336/96 |
| 4,199,743 * | 4/1980 | Martincic .............................. 336/96 |

* cited by examiner

*Primary Examiner*—Anh Mai
(74) *Attorney, Agent, or Firm*—Stevens, Davis, Miller & Mosher, LLP

(57) ABSTRACT

An ignition coil device, which is mounted in a plug hole of an internal combustion engine, comprises a primary coil 1 wound to have a first diameter, a secondary coil 2 wound on a bobbin 2A and disposed inside the primary coil 1, an iron core 3 disposed inside the bobbin 2A, and a shielding case 10 disposed around the primary coil 1, a gap between the primary coil 1 and the secondary coil 2 being filled with an insulating resin 12. The primary coil 1 is made bobbinless so as to secure and increase the withstand voltages of the primary coil and the secondary coil.

1 Claim, 4 Drawing Sheets

IGNITION DEVICE FOR INTERNAL COMBUSTION ENGINE

This is a division of application Ser. No. 08/967,945 filed Nov. 12, 1997 now abn.

BACKGROUND OF THE INVENTION

1. Field of the Invention

This invention relates to an ignition coil device for an internal combustion engine, and more particularly, to an ignition coil device for an internal combustion engine which is to be mounted in a plug hole of an engine body to apply high voltages directly to a spark plug.

2. Description of the Related Art

FIG. 4 shows a conventional ignition coil device for an internal combustion engine. In FIG. 4, reference numeral 21 denotes a cylindrical case made of an insulating resin, and a flat plate portion is integrally formed at the top of the case 21. Reference numeral 22 denotes a primary coil wound on a cylindrical bobbin 22A, the primary coil 22 being disposed in the case 21. Reference numeral 23 denotes a secondary coil wound on a cylindrical bobbin 23A, the secondary coil 23 being disposed inside the bobbin 22A for the primary coil 22. Reference numeral 24 denotes an iron core made of a magnetic material, the iron core 24 being inserted into the bobbin 23A for the secondary coil 23. Reference numeral 25 denotes magnets provided at upper and lower ends of the iron core 24, the magnets 25 being used for producing a bias magnetic field. Reference numeral 26 denotes a high-voltage output terminal attached to the lower end of the bobbin 23A for the secondary coil 23, and 27 denotes a coiled spring which is connected to the high-voltage output terminal 26 by screwing a screw 28 into a hole of the high-voltage output terminal 26.

The high-voltage output terminal 26 is connected to the secondary coil 23. Reference numeral 29 denotes a cylindrical shielding case with a slit, and 30 denotes a cylindrical insulating shell made of rubber. While being kept hot, an epoxy resin based insulating resin 31 is vacuum-injected into the case 21 housing the secondary coil 23, the primary coil 22, the iron core 24 and the magnets 25 so that the insulating resin 31 is filled in between the iron core 24 and the secondary coil 23, between the secondary coil 23 and the primary coil 22 and between the primary coil 22 and the case 21 to thereby enhance the insulating performance. Reference numeral 32 denotes an ignitor unit in which a power transistor, a switching element and so on are housed. The ignitor unit 32 is mounted at its lower portion on the flat plate portion of the case 21. The ignitor unit 32 is integrally formed with a connector portion and a mounting portion. By making use of holes in the mounting portion, the ignitor unit 32 is screwed to a cylinder head attached to the outer surface of an engine block.

When the ignition coil device shown in FIG. 4 is inserted into a plug hole of an engine body, a connecting portion of a spark plug is caused to come into an opening formed in the lower portion of the insulating cylindrical shell 30 made of rubber until the spring 27 is brought into contact with the connecting portion of the spark plug. In this condition, the ignitor unit 32 is screwed to the cylinder head by making use of the holes in the mounting portion of the ignitor unit 32.

In the state that the ignition coil device is inserted into the plug hole of the engine body as described above, the electric power and an on-off signal are supplied to a drive circuit and the switching element such as the power transistor housed in the ignitor unit 32 through the connector portion formed integrally with the ignitor unit 32 mounted on the case 21, so as to turn on/off the power transistor to thereby supply high ignition voltages to the spark plug.

Namely, when the switching element provided in the ignitor unit 32 of the above-described ignition coil device is turned off, the electric current flowing through the power transistor to the primary coil 22 is cut off and then high voltages are produced in the secondary coil 23 so as to be applied to the spark plug through the high-voltage output terminal 26, the screw 28 and the spring 27.

However, in the above-described conventional ignition coil device, since it is impossible for the compact type device that is to be mounted in the plug hole to increase the thickness of the layer of the insulating resin 31, and since the difference in thermal expansion between the bobbins 22A, 23A and the insulating resin 31 attributed to the temperature cycle causes separation to occur at the boundary surface, it is difficult to secure the withstand voltages of the primary coil and the secondary coil.

SUMMARY OF THE INVENTION

The present invention enables the above-described problems of the prior art, to be solved and an object of the invention is to provide an ignition coil device for an internal combustion engine which is capable of securing the withstand voltage and preventing the separation from occurring at the boundary surface of an insulating resin attributed to the temperature cycle.

In order to achieve the above object, there is provided according to the present invention an ignition coil device for an internal combustion engine which comprises a primary coil wound to have larger diameter, a secondary coil wound on a bobbin having smaller diameter and disposed inside the primary coil, an iron core disposed inside the bobbin having smaller diameter, and a cylindrical case disposed around the primary coil, the primary coil being made bobbinless so as to secure the withstand voltages of the primary coil and the secondary coil.

According to the invention, there is provided a device which comprises the primary coil wound to have larger diameter, the secondary coil wound on the bobbin having smaller diameter and disposed inside the primary coil, the iron core disposed inside the bobbin having smaller diameter and the cylindrical case disposed around the primary coil, and the primary coil is made bobbinless so as to secure the withstand voltages of the primary coil and the secondary coil.

Also, according to the invention, the inside of the case is sealed up with an insulating casting material made of the same elastic resin as the inside of the bobbin having smaller diameter, and therefore it is possible to prevent the insulation deterioration attributed to the temperature cycle and improve the insulation resistance between the coils and the like.

Further, according to the invention, gaps between the primary coil and the cylindrical case, between the primary coil and the secondary coil and between the iron core and the bobbin having smaller diameter are sealed up with a single kind of insulating resin, and therefore it is possible to prevent the insulation deterioration attributed to the temperature cycle and improve the insulation resistance between the coils and the like.

DETAILED DESCRIPTION OF THE PREFERRED EMBODIMENTS

Now, a preferred embodiment of the present invention will be described hereinafter with reference to FIG. 1.

(Embodiment 1)

Figure 1:
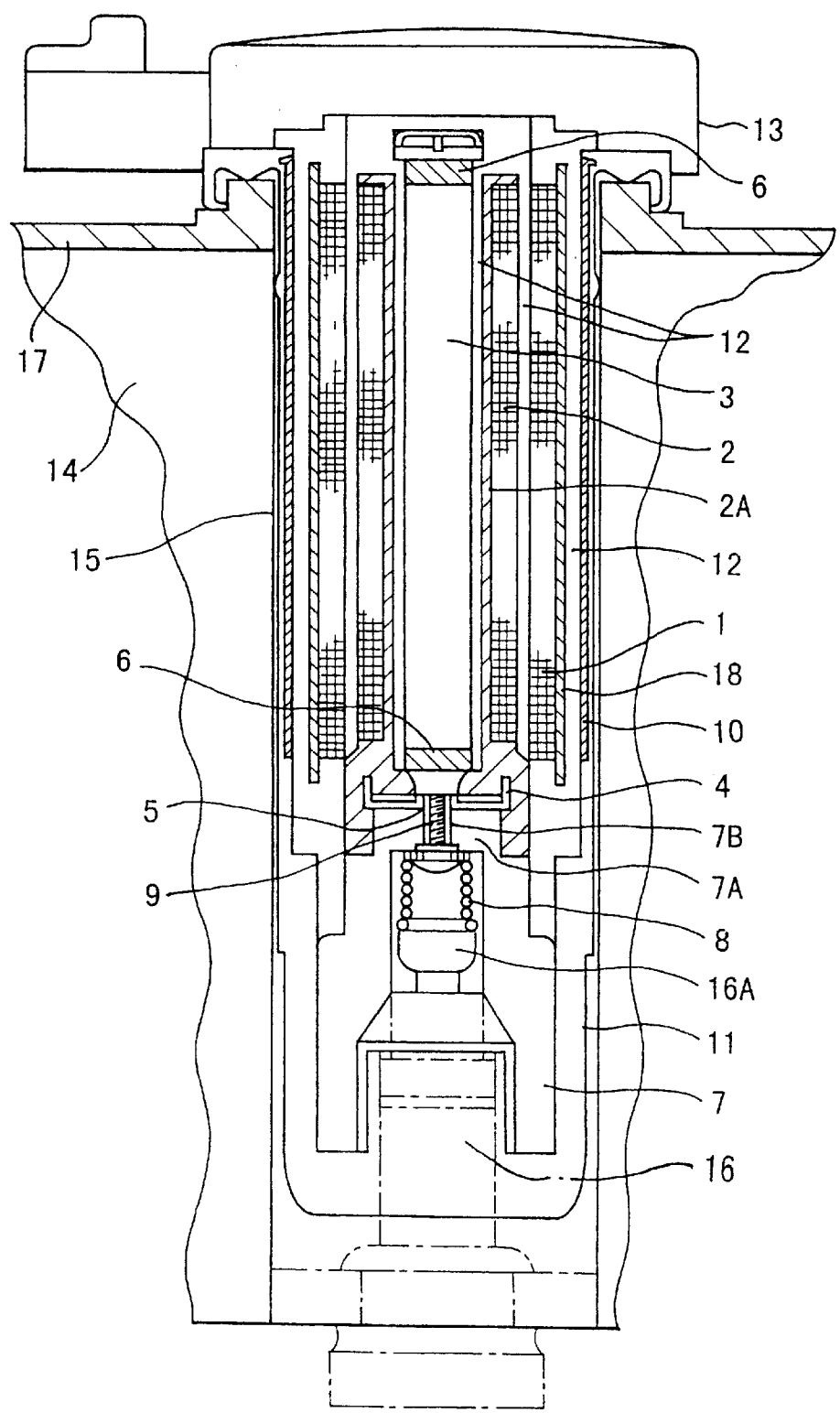
FIG. 1 is a sectional view of an ignition coil device for an internal combustion engine according to a first embodiment of the present invention.

FIG. 1 is a sectional view of an ignition coil device for an internal combustion engine according to the present embodiment. In FIG. 1, reference numeral 1 denotes a primary coil wound to have larger diameter, and 2 denotes a secondary coil wound on a cylindrical bobbin 2A having smaller diameter. The secondary coil 2 is disposed inside the primary coil 1. Reference numeral 3 denotes an iron core made of a magnetic material, the iron core 3 being inserted into the bobbin 2A for the secondary coil 2. Reference numeral 4 denotes a high-voltage output terminal attached to the lower end portion of the bobbin 2A for the secondary coil 2, the high-voltage output terminal 4 being formed with a screw hole 5 in the central portion thereof. Reference numeral 6 denotes magnets provided at upper and lower ends of the iron core 3, the magnets 6 being used for producing a bias magnetic field.

Reference numeral 7 denotes a cylindrical socket made of an insulating resin, the cylindrical socket 7 being integrally formed with a small-diameter cylinder portion 7A at the top thereof. A through hole 7B is formed in the center of the small-diameter cylinder portion 7A. The small-diameter cylinder portion 7A of the socket 7 is fitted in the lower end of the bobbin 2A for the secondary coil 2. Reference numeral 8 denotes a coiled spring, and 9 denotes a screw. The screw 9 is inserted into the spring 8 and the through hole 7B of the socket 7 to be screwed in the screw hole 5 of the high-voltage output terminal 4 attached to the lower end portion of the secondary coil 2 so that the socket 7 is attached to the bobbin 2A for the secondary coil 2 and the spring 8 is fixed to the inner bottom surface of the socket 7 and, furthermore, the high-voltage output terminal 4 and the spring 8 are electrically connected through the medium of the screw 9.

Reference numeral 10 denotes a cylindrical shielding case with slit, the shielding case 10 being so inserted as to be fitted in the inner wall surface of an insulating shell 11 which forms a cylindrical case. The insulating shell 11 is molded from an insulating resin in such a manner that a flat plate portion is formed at the top thereof. A cylindrical clamper made of rubber, in which a spark plug 16 to be described later is inserted, is fixed to an opening formed in the bottom of the insulating shell 11. Reference numeral 12 denotes an insulating resin such as epoxy based resin used as an insulating casting material. The insulating resin 12 is filled in between the iron core 3 and the bobbin 2A, between the secondary coil 2 and the primary coil 1 and between the primary coil 1 and the shielding case 10.

Reference numeral 13 denotes an ignitor unit housing a power transistor Tr, a switching element and so on. The ignitor unit 13 is mounted at its lower portion on the flat plate portion of the insulating shell 11. The ignitor unit 13 is integrally formed with a connector portion and a mounting portion. The ignitor unit 13 is screwed to a cylinder head 17 attached to the outer surface of an engine block by making use of the mounting portion. Reference numeral 15 denotes a plug hole provided in an engine body 14, and 16 denotes a spark plug. Reference numeral 18 denotes a cylindrical insulating tube so inserted as to be placed around the primary coil 1 for preventing the primary coil from being brought into contact with the shielding case 10 to be damaged when the primary coil is inserted. The insulating tube 18 may be a net-like insulating tube, a shrink tube with slots or an insulating tape. Further, if the primary coil and the shielding case 10 are sufficiently spaced out, the insulating tube 18 may be dispensed with.

Now, description will be given of how to assemble and mount the ignition coil device for the internal combustion engine according to the present embodiment.

In the first place, the iron core 3 and the magnets 6 are inserted into the bobbin 2A for the secondary coil 2 in such a manner that the magnets 6 are provided at the upper and lower ends of the iron core 3. The terminal plate 4 as the high-voltage output terminal is attached to the lower end of the bobbin 2A for the secondary coil 2, and the small-diameter cylinder portion 7A of the socket 7 is fitted in the lower portion of the bobbin 2A, and then the socket 7 and the spring 8 are fixed by means of the screw 9. In consequence, the bobbin 2A for the secondary coil 2 is integrated with the socket 7.

Subsequently, the insulating resin 12 in the hot condition is used to form an insulating layer on the outside of the bobbin 2A for the secondary coil 2. After hardening, the primary coil formed of heat-fused copper wire is fitted on the outer peripheral surface of the insulating layer made of the insulating resin 12, which in turn is inserted into the insulating shell 11 after being covered with the insulating tube 18. Thereafter, while being kept hot, the insulating resin 12 is vacuum-injected from the top of the insulating shell 11 so that the insulating resin 12 is filled in between the iron core 3 and the bobbin 2A, between the primary coil 1 and the shielding case 10 and so on to thereby enhance the insulating performance. The insulating resin 12 injected is hardened inside the insulating shell 11. Afterwards, the ignitor unit 13 is mounted on the flat plate portion at the top of the insulating shell 11.

As shown in FIG. 1, when the ignition coil device of the above embodiment is inserted into the plug hole 15 of the engine body 14, a connecting portion 16A of the spark plug 16 is caused to come into a damper provided at the lower opening of the insulating shell 11 until the spring 8 is brought into contact with the connecting portion 16A of the spark plug 16. In this condition, the ignitor unit 13 is screwed to the cylinder head 17 by making use of holes formed in the mounting portion of the ignitor unit 13.

As described above, in the present embodiment, after the insulating layer of the insulating resin 12 is formed on the outside of the secondary coil 2 and hardened, the primary coil 1 is disposed around the thus-formed insulating layer and then the insulating resin 12 is injected to seal up the primary coil 1. Therefore, since the primary coil can be made bobbinless, there will be caused no separation at the boundary surface between the bobbin for the primary coil and the insulating resin, and since the gap between the primary coil 1 and the secondary coil 2 is filled up with a single kind of insulating resin, the withstand voltage can be increased.

(Embodiment 2)

Figure 2:
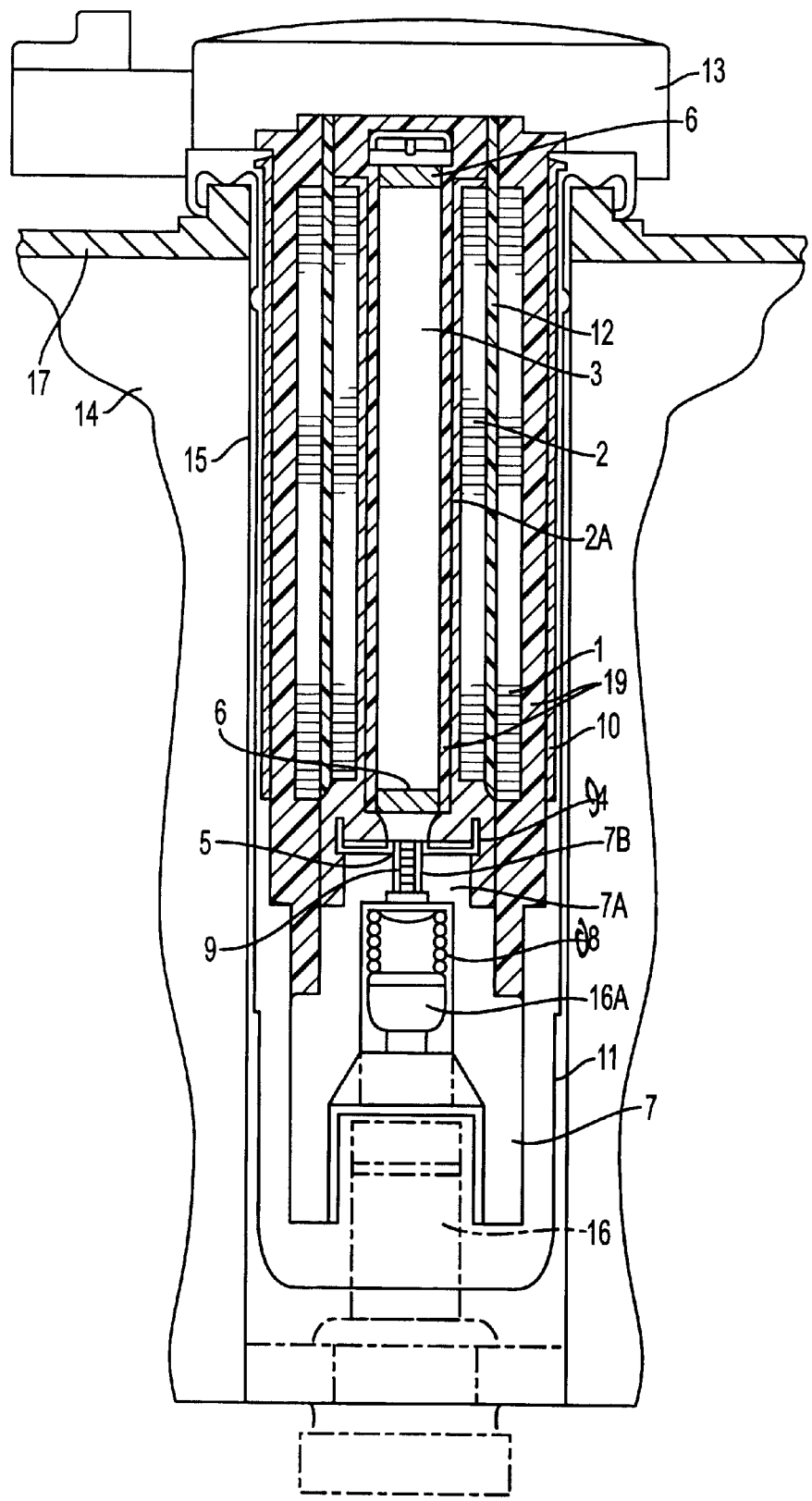
FIG. 2 is a sectional view of an ignition coil device for an internal combustion engine according to a second embodiment of the invention.

FIG. 2 is a sectional view of an ignition coil device for an internal combustion engine according to another embodiment of the present invention. This embodiment is different from the above-described embodiment 1 in the following points. In the embodiment 1, after forming the insulating layer of the insulating resin 12 on the outside of bobbin 2A for the secondary coil and hardening the same, the primary coil is fitted thereon, which in turn is inserted into the insulating shell 11 after being covered with the insulating tube 18, and thereafter the insulating resin 12 is vacuum-injected from the top of the insulating shell 11 while being kept hot. On the other hand, in this embodiment, a hard insulating resin 12 is used for form the insulating layer on the outside of the bobbin 2A for the secondary coil and, after hardening, the primary coil 1 is formed by winding a number of turns of wire directly on the insulating layer, which is not covered with the insulating tube. Further, in this embodiment, an elastic material 19 is cast into between the iron core 3 and the bobbin 2A for the secondary coil 2 and between the primary coil 1 and the shielding case 10.

According to this embodiment, the same effect as with embodiment 1 can be obtained and, furthermore, separation can reliably be prevented from occurring between the iron core 3 and the bobbin 2A for the secondary coil 2 and between the primary coil 1 and the insulating shell 11 due to the temperature cycle, thereby making it possible to further improve the reliability against the temperature cycle.

(Embodiment 3)

Figure 3:
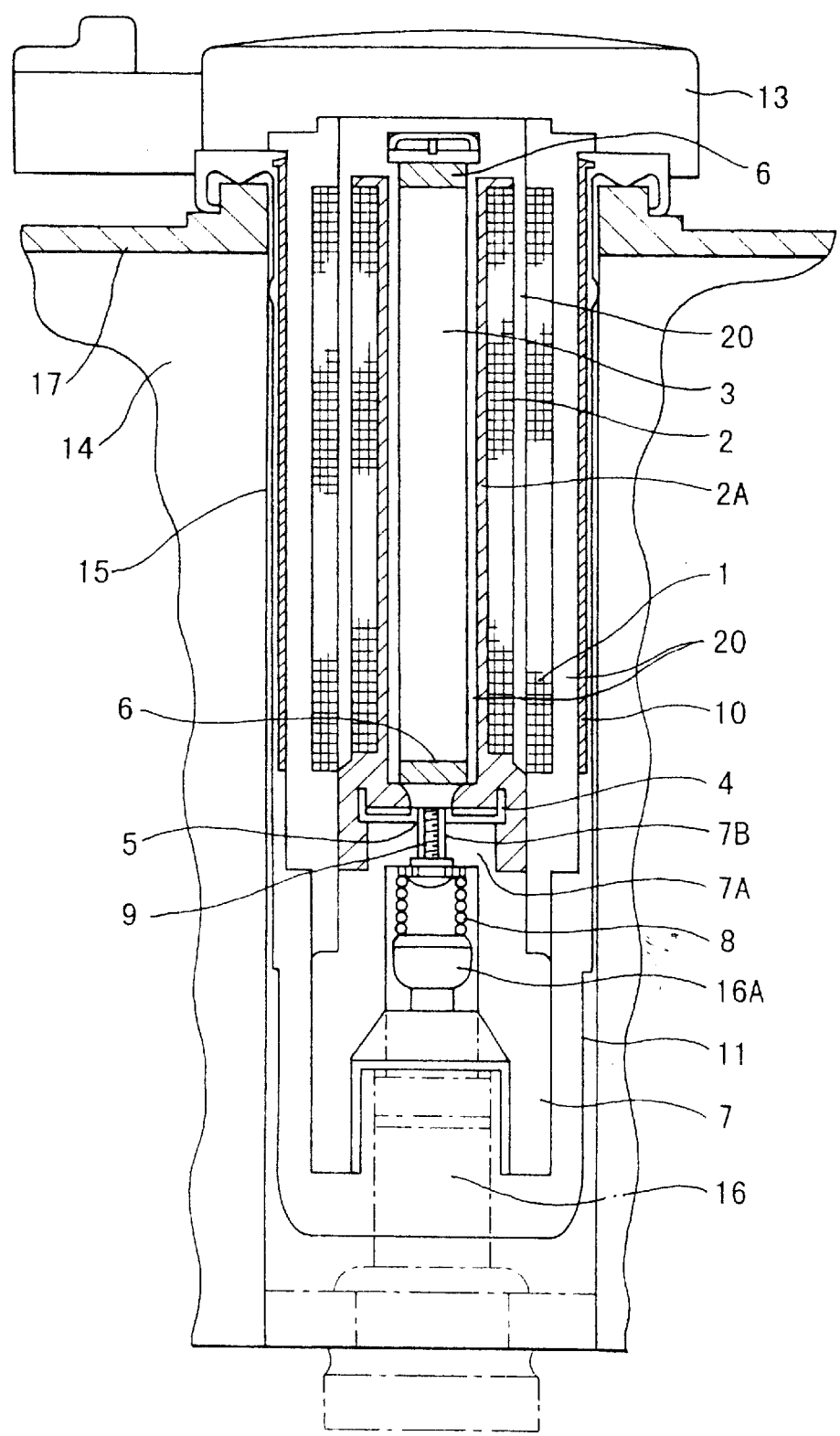
FIG. 3 is a sectional view of an ignition coil device for an internal combustion engine according to a third embodiment of the invention.
Figure 4:
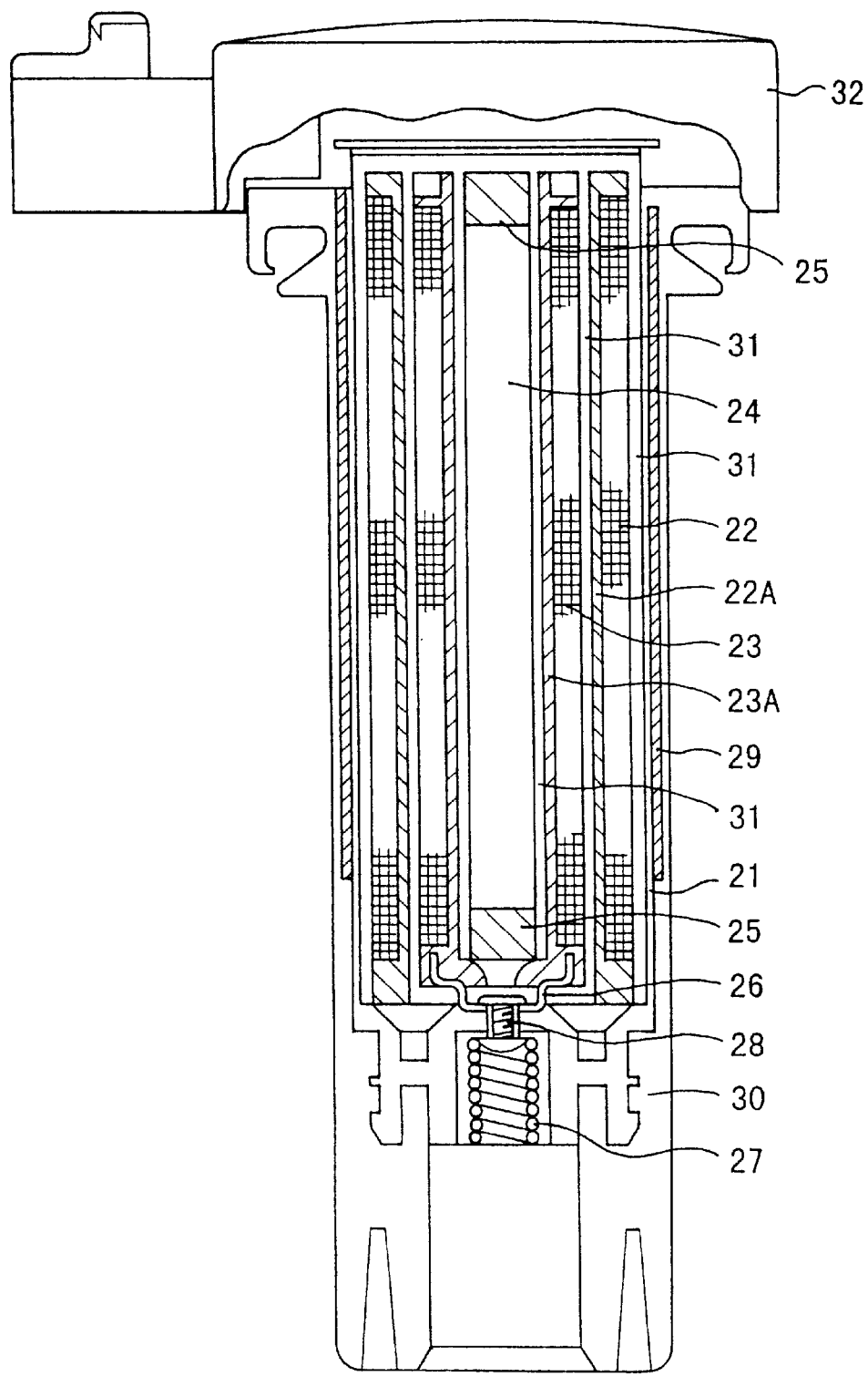
FIG. 4 is a sectional view of a conventional ignition coil device for an internal combustion engine.

FIG. 3 is a sectional view of an ignition coil device for an internal combustion engine according to a third embodiment. In FIG. 3, reference numeral 20 denotes an insulating resin having elasticity, and the other components are the same as those of embodiment 2. In the present embodiment, the elastic insulating resin 20 is cast into between the iron core 3 and the bobbin 2A for the secondary coil 2, between the secondary coil 2 and the primary coil 1 and between the primary coil 1 and the shielding case 10 (or the insulating shell 11). This makes it possible to secure the withstand voltages of the primary coil and the secondary coil and prevent the separation from occurring between the primary coil and the secondary coil attributed to the temperature cycle. At the same time, it also is possible to reliably prevent the separation from occurring between the iron core 3 and the bobbin 2A for the secondary coil 2 and between the primary coil 1 and the shielding case 10 (or the insulating shell 11) due to the temperature cycle, thereby making it possible to further improve the reliability against the temperature cycle.

As has been described above, according to the present invention, the primary coil is disposed around the insulating resin layer formed on the outside of the secondary coil and then insulating resin is injected to seal up the gap between the primary coil and the case, and therefore the primary coil can be made bobbinless. In consequence, even for the compact type that is to be mounted in the plug hole, the withstand voltages of the primary coil and the secondary coil can advantageously be increased.

Further, according to the invention, an elastic material is cast into gaps between the iron core and the bobbin for the secondary coil and between the primary coil and the gaps between the iron core and the bobbin case, and therefore it is possible to reliably prevent the separation from occurring at the boundary surface of the insulating resin due to the temperature cycle.

What is claimed is:

1. An ignition coil device for an internal combustion engine comprising:

a primary coil;

a secondary coil wound on a bobbin, said secondary coil having smaller diameter than and disposed inside said primary coil;

an iron core disposed inside said bobbin;

a cylindrical case disposed around said primary coil, and said primary coil being bobbinless, wherein an insulating resin filled in between the primary coil and the cylindrical case and inside the bobbin is more elastic than another insulating resin filled in between the primary coil and the secondary coil.

* * * * *